US008977815B2

(12) United States Patent
Heggelund et al.

(10) Patent No.: US 8,977,815 B2
(45) Date of Patent: Mar. 10, 2015

(54) CONTROL OF ENTRY OF PROGRAM INSTRUCTIONS TO A FETCH STAGE WITHIN A PROCESSING PIPEPLINE

(75) Inventors: Frode Heggelund, Trondheim (NO); Rune Holm, Trondheim (NO); Andreas Due Engh-Halstvedt, Trondheim (NO); Edvard Feilding, Trondheim (NO)

(73) Assignee: ARM Limited, Cambridge (GB)

( * ) Notice: Subject to any disclaimer, the term of this patent is extended or adjusted under 35 U.S.C. 154(b) by 1137 days.

(21) Appl. No.: 12/926,600

(22) Filed: Nov. 29, 2010

(65) Prior Publication Data

US 2012/0137076 A1 May 31, 2012

(51) Int. Cl.
*G06F 12/00* (2006.01)
*G06F 12/08* (2006.01)
*G06F 9/38* (2006.01)

(52) U.S. Cl.
CPC .......... *G06F 12/0855* (2013.01); *G06F 9/3802* (2013.01); *G06F 9/3814* (2013.01)
USPC .................... 711/123; 711/118; 711/E12.023; 711/140; 712/205; 712/206; 712/207; 712/220; 712/225

(58) Field of Classification Search
USPC ........................................................ 711/123
See application file for complete search history.

(56) References Cited

PUBLICATIONS

Wapedia, "Cache Memory", Wiki: CPU Cache, online, http://wapedia.mobi/en/CPU_cache, printed Nov. 26, 2010, 7 pages.
Byrd et al., "Multithredded Processor Architectures", *IEEE Spectrum*, Aug. 1995, pp. 38-46.

*Primary Examiner* — Reginald Bragdon
*Assistant Examiner* — Hamdy S Ahmed
(74) *Attorney, Agent, or Firm* — Nixon & Vanderhye P.C.

(57) ABSTRACT

A processing pipeline 6, 8, 10, 12 is provided with a main query stage 20 and a fetch stage 22. A buffer 24 stores program instructions which have missed within a cache memory 14. Query generation circuitry within the main query stage 20 and within a buffer query stage 26 serve to concurrently generate a main query request and a buffer query request sent to the cache memory 14. The cache memory returns a main query response and a buffer query response. Arbitration circuitry 28 controls multiplexers 30, 32 and 34 to direct the program instruction at the main query stage 20, and the program instruction stored within the buffer 24 and the buffer query stage 26 to pass either to the fetch stage 22 or to the buffer 24. The multiplexer 30 can also select a new instruction to be passed to the main query stage 20.

26 Claims, 7 Drawing Sheets

| Main Query Response | Buffer Query Response | Buffer Status | Action controlled by arbitration circuitry |
|---|---|---|---|
| not req | not req | empty | Main query stage, buffer and fetch stage held idle |
| not req | miss | not empty | Remove BQS Instruction from buffer and return to main stage |
| not req | hit | not empty | Remove BQS Instruction from buffer and send to fetch stage to trigger fetch of data from cache |
| miss | not req | empty | Add MQS Instruction to buffer and load new instruction to main query stage |
| miss | miss | not empty and not full | Add MQS Instruction to buffer and load new instruction to main query stage |
| miss | miss | full | Add MQS Instruction to buffer, remove BQS Instruction from bufffer and return to main stage |
| miss | hit | not empty | Add MQS Instruction to buffer, remove BQS Instruction from bufffer and send to fetch stage to trigger fetch of data from cache |
| hit | not req | empty | Remove MQS Instruction from main query stage and send to fetch stage to trigger fetch of data from cache and load new instruction to main query stage |
| hit | miss | not empty | Remove MQS Instruction from main query stage and send to fetch stage to trigger fetch of data from cache, load new instruction to main query stage and hold buffer idle |
| hit | hit | not empty | Remove MQS Instruction from main query stage and send to fetch stage to trigger fetch of data from cache memory, load new instruction to main query stage and hold buffer idle |
| hit | hit | not empty | Remove MQS Instruction from main query stage and add to buffer, remove BQS Instruction from buffer and send to fetch stage to trigger fetch of data from cache and load new instruction to main query stage |

(two options for last two rows)

| Score | Name | Description |
| --- | --- | --- |
| 0 | No thread | There was no thread available for testing this cycle |
| 1 | Full miss | None of the four requested texels are in the texture cache |
| 2 | Partial hit | Some, but not all of the four requested texels are in the texture cache |
| 3 | Full hit | All of the four requested texels are in the texture cache |

FIG. 7

| T0 | T1 | PB Full | Thread 0 (In cache Test 0) | Thread 1 (In cache Test 1) |
|---|---|---|---|---|
| 0 | 0 | X(no) | No thread present | No thread present |
| 0 | 1 | X(no) | No thread present | Thread returns to pause buffer |
| 0 | 2 | X(no) | No thread present | Thread returns to pause buffer. Hit texels filtered |
| 0 | 3 | X(no) | No thread present | Thread continues. All texels filtered |
| 1 | 0 | X(no) | Thread enters pause buffer | No thread present |
| 1 | 1 | no | Thread moves to Cache Test 1 | Thread returns to pause buffer |
| 1 | 1 | yes | Thread enters pause buffer | Thread returns to Loop 2 |
| 1 | 2 | no | Thread moves to Cache Test 1 | Thread returns to pause buffer. Hit texels filtered |
| 1 | 2 | yes | Thread enters pause buffer | Thread returns to Loop 2. Hit texels filtered |
| 1 | 3 | X(no) | Thread enters pause buffer | Thread continues. All texels filtered |
| 2 | 0 | X(no) | Enters pause buffer. Hit texels filtered | No thread present |
| 2 | 1 | no | Thread moves to Cache Test 1. Hit texels filtered | Thread returns to pause buffer |
| 2 | 1 | yes | Thread enters pause buffer. Hit texels filtered | Thread returns to Loop 2 |
| 2 | 2 | no | Thread moves to Cache Test 1 | Thread returns to pause buffer. Hit texels filtered |
| 2 | 2 | yes | Thread enters pause buffer | Thread returns to Loop 2. Hit texels filtered |
| 2 | 3 | X(no) | Thread enters pause buffer | Thread continues. All texels filtered |
| 3 | 0 | X(no) | Thread continues. All texels filtered | No thread present |
| 3 | 1 | X(no) | Thread continues. All texels filtered | Thread returns to pause buffer |
| 3 | 2 | X(no) | Thread continues. All texels filtered | Thread returns to pause buffer |
| 3 | 3 | X(no) | Thread moves to Cache Test 1 | Thread continues. All texels filtered |

FIG. 8

CONTROL OF ENTRY OF PROGRAM INSTRUCTIONS TO A FETCH STAGE WITHIN A PROCESSING PIPEPLINE

BACKGROUND OF THE INVENTION

1. Field of the Invention

This invention relates to data processing systems. More particular, this invention relates to data processing systems incorporating a processing pipeline including a fetch stage which attempts to fetch data from a cache memory where that data may or may not be present within the cache memory.

2. Description of the Prior Art

It is known to provide data processing systems with processing pipelines such that the overall processing of a program instruction or a thread of program instructions may be divided between the pipelined stages and so the execution of many program instructions or threads can be overlapped in a manner substantially increasing instruction processing throughput.

Within such processing systems it is also known to provide cache memories which store a copy of data stored within a main memory. The copy of the data stored in the cache memory is more rapidly accessible than the data stored in the main memory. If a program instruction or thread attempts to access data which is not present within the cache memory, then the progress of that program instruction or thread is delayed until the data concerned becomes available. In some systems, a cache miss may cause the whole instruction pipeline to stall with further processing not being possible until the data which was the subject of the cache miss is returned from the main memory many processing cycles later. In order to overcome this processing bottleneck, it is known to provide systems such as out-of-order processors which seek to reorder program instruction execution such that stalled program instructions need not prevent the processing of subsequent program instructions in the program order which do not depend upon those stalled instructions.

Another known approach to the problem of cache misses is to issue a query to the cache for the data required by a program instructional thread significantly in advance of that data actually being required by the program instructional thread. If a cache miss occurs, then this advance querying of the cache permits a sufficient time that the data missing from the cache memory may be fetched to the cache memory before it is actually required. However, a problem with this approach is that given the high latency which can be associated with a requirement to fetch data from a main memory when a miss has occurred in the cache memory, it becomes necessary to query the cache so far in advance of the data being required that the needed buffering requirements for program instructions of threads in progress along the pipeline between the stage at which the query is performed and the stage at which the data is required become excessively large. Excessive buffering requirements are disadvantageous in terms of circuit size, power consumption, cost and other factors.

SUMMARY OF THE INVENTION

Viewed from one aspect the present invention provides apparatus for processing data comprising:

a cache memory coupled to a main memory;

a processing pipeline coupled to said cache memory, configured to process a stream of program instructions and having a plurality of processing stages including a main query stage responsive to a program instruction at said main query stage to generate a main query request to said cache memory, said cache memory being responsive to said main query request to generate a main query response signal indicative of whether or not said cache memory is ready to service an access request by said program instruction at said main query stage;

a buffer configured to store said program instruction from said main query stage if said main query response signal indicates said cache memory is not ready to service said access request by said program instruction at said main query stage;

a buffer query stage responsive to a program instruction stored within said buffer to generate a buffer query request to said cache memory, said cache memory being responsive to said buffer query request to generate a buffer query response signal indicative of whether or not said cache memory is ready to service an access request by said program instruction stored within said buffer; and a fetch stage responsive to said main query response signal and said buffer query response signal to access said cache memory to service one of said access request by said program instruction at said main query stage and said access request by said program instruction stored within said buffer.

The present technique uses a buffer to store program instructions for which a cache miss has occurred. Program instructions which have not resulted in a cache miss need not be buffered and accordingly the storage requirements for the buffer are advantageously lessened. The technique requires the provision of both a main query stage and a buffer query stage which generate respective query requests to the cache memory. The normal prejudice within this technical field would suggest that having to provide two query stages would be disadvantageous. However, using these two query stages permits a reduction in the size of the buffer that is more than sufficient to compensate for the extra query stage and which is also likely to be able to hide higher levels of memory latency.

The access requests may be read access requests and/or write access requests. A read access request may be serviced if the data is present within the cache. A write access request may be serviced if the data is present within the cache or at least a storage location in to which the data may be written is available within the cache.

It will be appreciated that the buffer could take a variety of different forms. However, a simple and effective form of the buffer is a first-in-first-out memory where the program instructions stored within the buffer and corresponding to the buffer query request is a program instruction least recently added to the first-in-first-out memory.

In many embodiments a clock signal will be used to define boundaries between processing cycles of the apparatus and within such embodiments it can be arranged that the fetch, the main query request and the buffer query request take place in the same processing cycle.

In this context, the cache memory may be configured to concurrently receive and then respond to the main query request and the buffer query request. The cache memory thus requires the ability to deal with two simultaneous query requests. The additional overhead associated with providing such a capability within the cache memory is more than compensated for by the advantages of reduced buffer size.

It will be appreciated that particular program instructions (which can also be considered to correspond to program threads in certain classes of embodiment) may not require data from the cache memory. In this case, the main query request and the buffer query request can indicate that data is not required.

In order to control which data is retrieved from the cache memory in response to the query requests and the query responses, there may be provided arbitration circuitry serving to control the main query stage, the buffer and the fetch stage.

The control imposed by the arbitration circuitry can take a wide variety of different forms in response to whether hit or miss signals are returned in respect of different query requests as well as the status of the buffer (e.g. empty full, partially full). In some embodiments, control by the arbitration circuitry will direct program instructions for which a hit has occurred to the fetch stage while program instructions for which a miss has occurred will be directed to the buffer. If hits occur for both the main query stage and the buffer query stage, then the program instruction from the buffer query stage may be preferred as this will be the older instruction. If a miss occurs for both the main query stage and the buffer query stage and the buffer is full, then the instruction from the buffer query stage may be removed from the buffer and returned to the main query stage while the instruction from the main query stage is moved into the buffer. This helps to reduce the likelihood of a lock situation arising. If a hit occurs at both the main query stage and the buffer query stage, then the program instruction from the buffer query stage may be preferred for sending to the fetch stage, but the program instruction from the main query stage, which it is known has just had a hit within the cache memory, may be sent to the front of the buffer instead of the end such that it will next be checked for a hit or miss within the cache memory and accordingly increase the likelihood of a hit occurring.

In some embodiments the data required may span multiple cache lines and accordingly it is possible that the query responses can include responses indicating the data is fully present, the data is partially present and the data is not present. In such embodiments the arbitration circuitry may be configured to preferentially send program instructions for which the query response has indicated fully present data to the fetch stage before program instructions corresponding to partially present data.

Whilst the present technique finds more general applicability, it is well suited to embodiments in which the stream of program instructions specified fine-grain multi-threaded processing since within this environment it is less complex to delay program instructions within the buffer since other program instructions within this stream corresponding to different threads may progress independently of the delayed program instructions.

Whilst the present technique is not restricted to any particular field of processing, the type of processing performed within graphics processing units is well suited to the present technique as it often involves the use of a large number of program instructions which do not depend upon each other and so may be independently stored and reordered.

Viewed from another aspect the present invention provides apparatus for processing data comprising:

cache memory means for storing data and coupled main memory means for storing data;

processing pipeline means for processing a stream of program instructions and coupled to said cache memory means, said processing pipeline means having a plurality of processing stage means for processing including main query stage means for generating a main query request to said cache memory means in response to a program instruction at said main query stage means, said cache memory means being responsive to said main query request to generate a main query response signal indicative of whether or not said cache memory is ready to service an access request by said program instruction at said main query stage means;

buffer means for storing said program instruction from said main query stage means if said main query response signal indicates said cache memory is not ready to service said access request by said program instruction at said main query stage means;

a buffer query stage means for generating a buffer query request to said cache memory means in response to a program instruction stored within said buffer means, said cache memory means being responsive to said buffer query request to generate a buffer query response signal indicative of whether or not said cache memory is ready to service an access request by said program instruction stored within said buffer means; and fetch stage means for accessing said cache memory means to service one of said data access request by said program instruction at said main query stage means and said access request by said program instruction stored within said buffer means in response to said main query response signal and said buffer query response signal.

Viewed from a further aspect the present invention provides a method of processing data comprising the steps of:

storing data within a cache memory coupled to a main memory;

processing a stream of program instructions within a processing pipeline coupled to said cache memory, said processing pipeline having a plurality of processing stages including main query stage;

generating a main query request to said cache memory in response to a program instruction at said main query stage;

in response to said main query request, generating a main query response signal indicative of whether or not said cache memory is ready to service an access request by said program instruction at said main query stage;

storing within a buffer said program instruction from said main query stage if said main query response signal indicates said cache memory is not ready to service said access request by said program instruction at said main query stage;

generating a buffer query request to said cache memory in response to a program instruction stored within said buffer;

in response to said buffer query request, generating a buffer query response signal indicative of whether or not said cache memory is ready to service an access request by said program instruction stored within said buffer; and accessing said cache memory to service one of said access request by said program instruction at said main query stage and said access request by said program instruction stored within said buffer in response to said main query response signal and said buffer query response signal.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 is a table schematically illustrating the action of arbitration circuitry in controlling the pipeline section illustrated in FIG. 2 in response to different combinations of query responses and buffer status;

FIG. 8 is a table schematically illustrating the control of the portion of the pipeline shown in FIG. 6 in accordance with an embodiment supporting partial hit responses.

DESCRIPTION OF EMBODIMENTS

Figure 1:
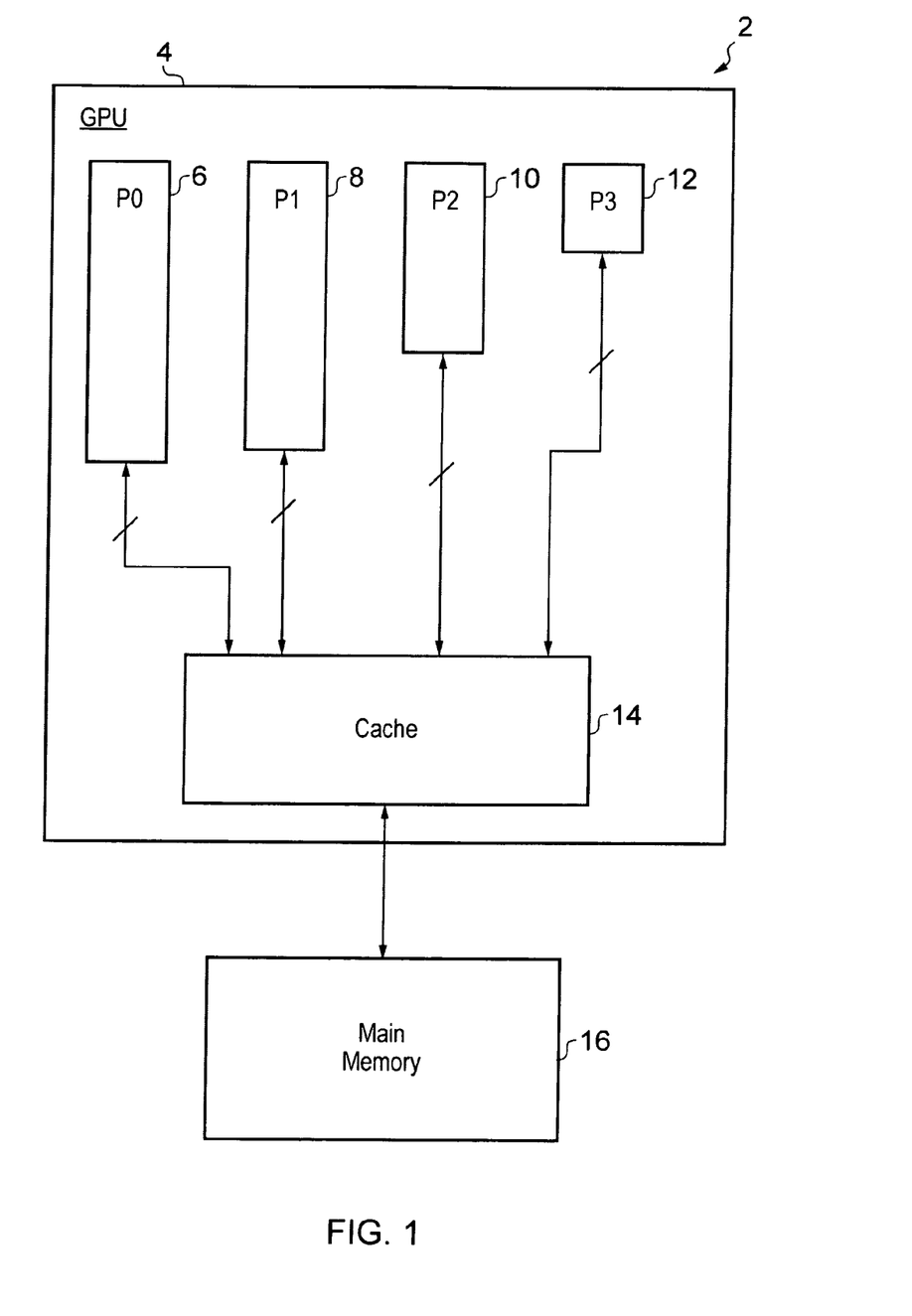
FIG. 1 schematically illustrates a processing apparatus including a plurality of processing pipelines, a cache memory and a main memory.

FIG. 1 schematically illustrates a processing system 2 including a graphics processing unit 4 incorporating a plurality of processing pipelines 6, 8, 10, 12 coupled to a cache memory 14. The graphics processing unit 4 is coupled to a main memory 16.

The cache memory stores a copy of data values which are present within the main memory 16. When a processing pipelines 6, 8, 10, 12 requires access to a data value it queries whether this is present within the cache memory 14. If a data value is not present, then a cache miss occurs and the data concerned is fetched from the main memory 16 and stored within the cache memory 14. If the cache memory 14 is full, then the miss occurs, then some data is evicted from the cache memory 14 (if full) in order to make space for the data being fetched from the main memory 16. Various cache eviction mechanisms and algorithms will be familiar to those in this technical field.

As illustrated in FIG. 1, the different processing pipelines 6, 8, 10, 12 can have different forms and perform different types of operation. Certain pipelines may be specialised for particular purposes, such as in the context of a graphics processing unit a pipeline specialised for the purpose of texturing may be provided. Other forms of processing pipelines 6, 8, 10, 12 provided may include a general purpose pipeline and a pipeline adapted to perform mathematical transformations or the like. The different processing pipelines 6, 8, 10, 12 can have different data requirements. Some or all of the processing pipelines 6, 8, 10, 12 may utilise the present techniques whereby a buffer is provided for storing program instructions (threads) which have missed in the cache memory 14 whilst multiple query stages are provided to query the cache memory 14 for the presence of particular data at each processing cycle.

Figure 2:
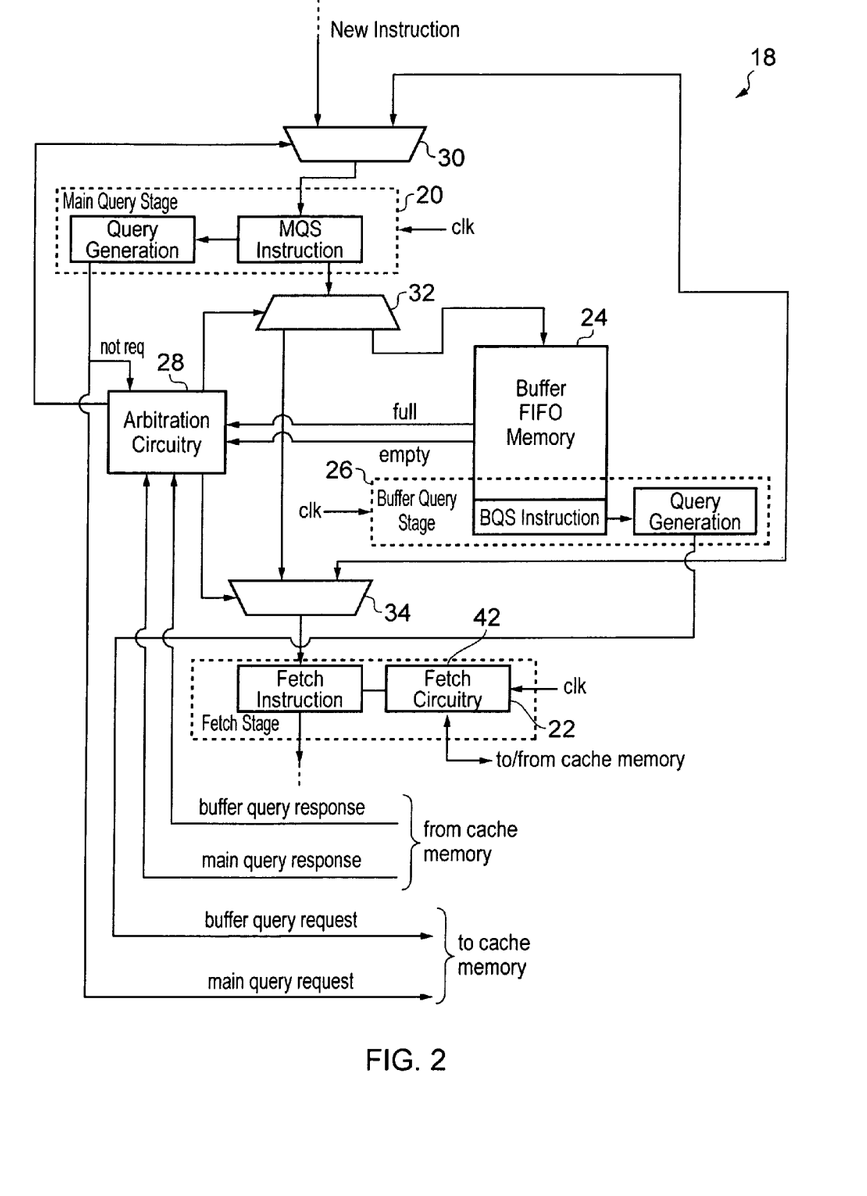
FIG. 2 schematically illustrates a portion of a processing pipeline including a main query stage, a buffer, a buffer query stage and a fetch stage.

FIG. 2 schematically illustrates a portion of a processing pipeline 18 incorporating a main query stage 20, a fetch stage 22, a buffer 24, a buffer query stage 26 and arbitration circuitry 28. The arbitration circuitry 28 generates control signals for controlling multiplexers 30, 32 and 34 which control the movement of program instructions between the main query stage 20, the fetch stage 22 the buffer 24 and the buffer query stage 26.

In operation a program instruction (thread) is stored within the main query stage 20. Query generation circuitry within the main query stage 20 is responsive to the program instruction at the main query stage to generate a main query request which is sent to the cache memory 14. This main query request triggers the cache memory 14 to determine whether or not the data concerned is present within the cache memory 14 and return a main query response indicating a hit or a miss (or in some embodiments a partial hit). This main query response is returned to the arbitration circuitry 28. If the program instruction stored within the main query stage is one which does not require data, then the query generation circuitry generates a not required signal which is directly supplied to the arbitration circuitry 28.

The buffer query stage 26 includes query generation circuitry which generates a buffer query request passed to the cache memory 14 in the same way as the main query request. The buffer query request gives rise to a buffer query response which is again returned to the arbitration circuitry 28.

The buffer 24 provides signals to the arbitration circuitry 28 indicating whether the buffer is full and whether the buffer is empty. If these signals indicate that the buffer 24 is neither full nor empty, then the buffer 24 will be partially full. If the buffer 24 is empty, then this corresponds to a buffer query request of not required. It will be appreciated that program instructions will only enter the buffer 24 when they require data and accordingly give rise to a miss within a cache. Accordingly, there will only be a not required indication from the buffer query stage when there are no program instructions stored within the buffer 24.

The arbitration circuitry 28 controls the multiplexer 30 to select for input to the main query stage 20 either a new instruction from further upstream within the processing pipelines 6, 8, 10, 12 or an instruction from an output of the buffer 24. The multiplexer 32 is controlled by the arbitration circuitry 28 to pass the output from the main query stage 20 either to the fetch stage 22 via the multiplexer 34 or to the input of the buffer 24. The multiplexer 34 is controlled by the arbitration circuitry 28 to select for input to the fetch stage 22 either the program instruction at the main query stage 20 passed via the multiplexer 32 or the program instruction stored within the buffer 24 at the output of the buffer 24 within the buffer query stage 26.

The fetch stage 22 receives a program instruction from the multiplexer 34 and uses fetching circuitry to fetch (access) the data corresponding to the program instruction at the fetch stage from the cache memory 14. Further details concerning the control performed by the arbitration circuitry 28 are given in relation to FIG. 4.

Figure 3:
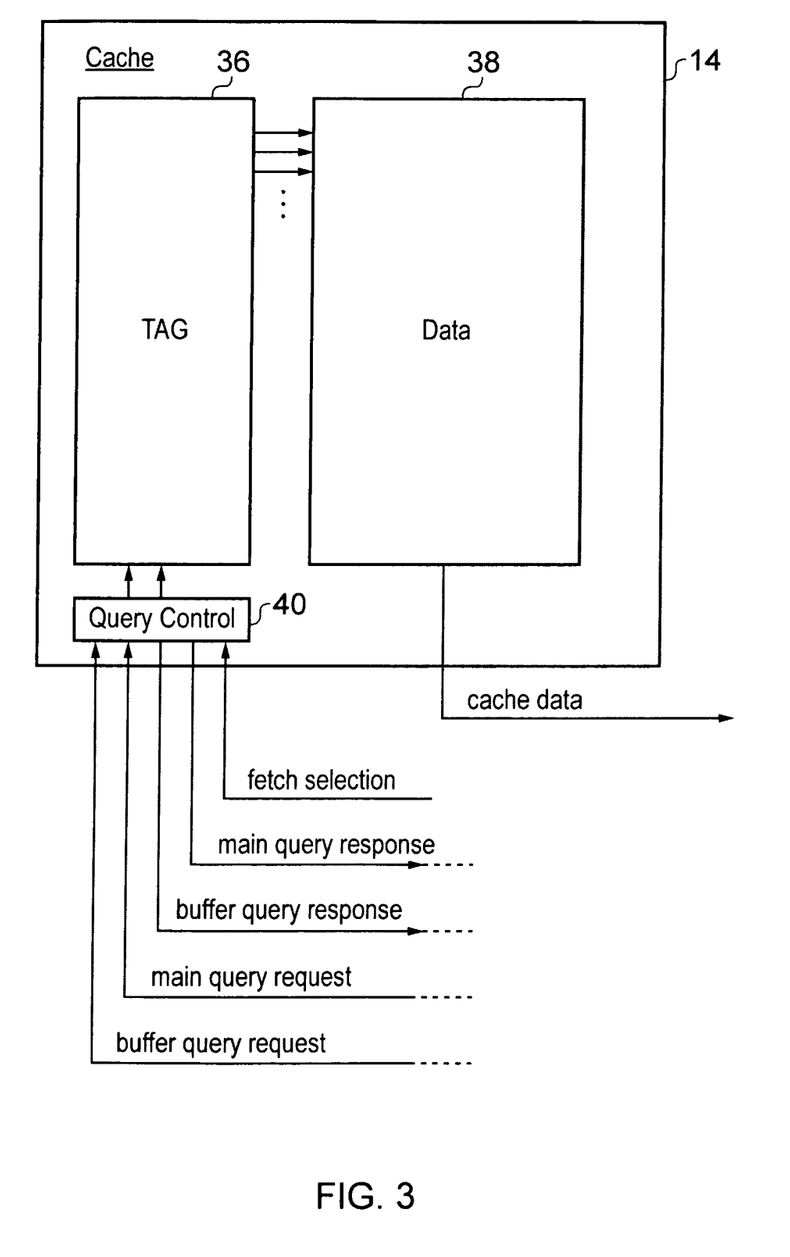
FIG. 3 schematically illustrates a cache memory supporting concurrent main query requests and buffer query requests.

FIG. 3 schematically illustrates the cache memory 14 in more detail. The cache memory 14 includes a tag memory 36 and a block of cache lines 38. The tag memory 36 stores address TAG values indicative of the memory addresses within the main memory 16 for which copies of the data values are stored within the corresponding cache lines of the block of cache lines 38. This type of cache arrangement will be familiar to those in this technical field. It will be appreciated that many different forms of cache memory 14 may be used, such as set associative, fully associative and arrangements in which set associative behaviour is modified with the addresses being subject to hashes in respect of different sets so as to reduce aliasing between the addresses. All of these different types of cache memory 14 may be used with the present techniques.

The cache memory 14 includes query control circuitry 40 which receives the main query request and the buffer query request generated by the main query stage 20 and the buffer query stage 26 respectively. The TAG memory 36 is a dual port memory allowing a check to be made concurrently for whether or not the data corresponding to the main query request and/or the data corresponding to the buffer query request is present within the cache memory 14. Accordingly, both a main query response and a buffer query response are returned from the query control circuitry 14 in the same processing cycle. The main query stage 20, the buffer query stage 26 and the fetch stage 22 may all be clocked off the same clock signal delimiting processing cycles within the processing pipelines 6, 8, 10, 12. Thus, within the same processing cycle both a main query request and a buffer query request may be generated and responded to and a selection made as to which program instruction should be supplied to the fetch stage as well as the fetching of that data from the cache memory 14 in response to a fetch selection signal generated by fetch circuitry 42 within the fetch stage 22.

FIG. 4 is a table representing the action of the arbitration circuitry 28 in response to various combinations of main query response, buffer query response and buffer status. The arbitration circuitry 28 generates control signals for the multiplexers 30, 32 and 34 as well as driving the associated data sources and data sinks to perform the actions specified in FIG. 4.

If the main query response is not required, the buffer query response is not required and the buffer status is empty, then the arbitration circuitry 28 controls the main query stage 20, the buffer 24 and the fetch stage 22 to all be held idle.

If the main query response is not required, the buffer query response is missed and the buffer status is not empty, then the arbitration circuitry 28 serves to control operations such that the program instruction stored within the buffer query stage 26 is removed from the buffer 24 and returned to the main query stage 20.

If the main query response is not required, the buffer query response is hit and the buffer status is not empty, then the arbitration circuitry 28 serves to control operations such that the program instructions stored at the buffer query stage 26 is removed from the buffer 24 and sent to the fetch stage 22 via the multiplexer 34 to trigger fetching of the data associated with the program instructions stored at the buffer query stage from the cache memory 14.

If the main query response is missed, the buffer query response is not required and the buffer status is empty, then the arbitration circuitry 28 serves to control operation such that the program instruction at the main query stage is added to the buffer 24 via the multiplexer 32 and a new instruction from upstreaming within the processing pipelines 6, 8, 10, 12 is added to the main query stage via the multiplexer 30.

If the main query response is missed, the buffer query response is missed and the buffer status is not empty and not full (i.e. partially full), then the arbitration circuitry 28 controls operation such that the program instruction at the main query stage 20 is added to the buffer 24 by the multiplexer 32 and a new instruction is loaded to the main query stage 20 via the multiplexer 30.

If the main query response is missed, the buffer query response is missed and the buffer status is full, then the arbitration circuitry 28 serves to perform control such that the program instruction at the main query stage 20 is added to the buffer 24 via the multiplexer 32, the program instruction stored within the buffer 24 and being at the buffer query stage 26 is removed from the buffer 24 and the buffer query stage 26 and returned to the main query stage 20 via the multiplexer 30 this helps to reduce the likelihood of locked conditions by ensuring some change of state even when it is not possible to fetch any data.

If the main query response is missed, the buffer query response is hit and the buffer status is not empty, then the arbitration circuitry 28 performs control such that the program instruction at the main query stage 20 is added to the buffer 24 via the multiplexer 32 and the program instruction stored within the buffer 24 at the buffer query stage 26 is removed from the buffer and sent to the fetch stage 22 by the multiplexer 34 to trigger fetching of data from the cache memory 14 corresponding to the program instruction passed to the fetch stage 22.

If the main query response is hit, the buffer query response is not required and the buffer status is empty (corresponding to the buffer query response being not required), then the arbitration circuitry 28 controls operations such that the program instruction at the main query stage 20 is removed from the main query stage via the multiplexers 32 and 34 and sent to the fetch stage 22 where it triggers fetching of data from the cache memory 14. A new instruction is also loaded into the main query stage 20 via the multiplexer 30.

If the main query response is hit, the buffer query response is missed and the buffer status is not empty, then the arbitration circuitry 28 performs control such that the program instruction at the main query stage 20 is removed from the main query stage 20 via the multiplexer 32 and the multiplexer 34 to the fetch stage 22 where it triggers fetching of data from the cache memory 14. A new instruction is loaded via the multiplexer 30 into the main query stage 20 and the buffer 24 is held idle.

If the main query response is hit, the buffer query response is hit and the buffer status is not empty, then in accordance with a first option the arbitration circuitry 28 performs control such that the program instruction at the main query stage 20 is removed from the main query stage 20 and sent to the fetch stage 22 via the multiplexers 30 and 34 to trigger fetching of data from the cache memory 14. A new instruction is loaded to the main query stage 20 via the multiplexer 30 and the buffer 24 is held idle.

If the main query response is hit, the buffer query response is hit and the buffer status is not empty, then in accordance with a second option the arbitration circuitry 28 performs control such that the program instruction at the main query stage 20 is sent to the buffer 24 via the multiplexer 32, the program instruction stored within the buffer 24 at the buffer query stage 26 is sent to the fetch stage 22 via the multiplexer 34 to trigger fetching of data from the cache memory 14 and a new instruction is loaded into the main query stage 20 via the multiplexer 30.

Figure 5:
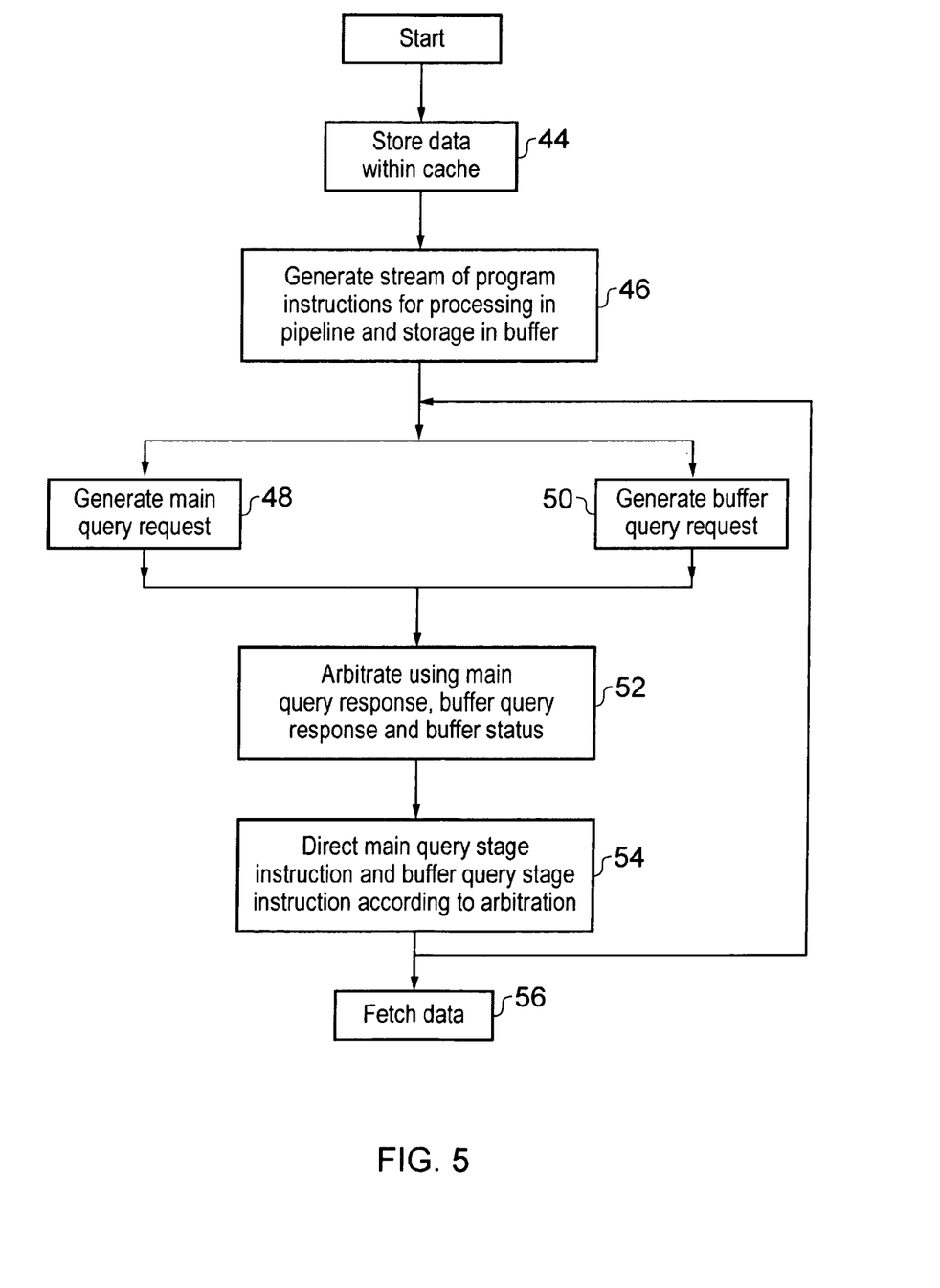
FIG. 5 is a flow diagram schematically illustrating the operation of the portion of a pipeline in accordance with the present techniques.

FIG. 5 is a flow diagram schematically illustrating the operation of the techniques described above. It will be appreciated that this flow diagram is highly schematic and that implemented control flow may differ. At stage 44 data is stored within a cache memory 14. At stage 46 a stream of program instructions are generated for processing within a processing pipeline 6, 8, 10, 12. Some of these instructions which have generated misses within the cache memory 14 are stored within a buffer 24 such that their data fetches can be retried at a later time.

At steps 48 and 50 concurrent main query requests and buffer query requests are generated and sent to the cache memory 14. At step 52 arbitration is performed responsive to a main query response, a buffer query response and a buffer status to determine which if any program instructions should be sent to a fetch stage 22 as well as control of the buffer 24. At step 54 the action selected at step 52 is performed. At step 56 any fetch of data is performed for the program instruction at the fetch stage 22 before processing is returned to steps 48 and 50 in the next processing cycle.

Figure 6:
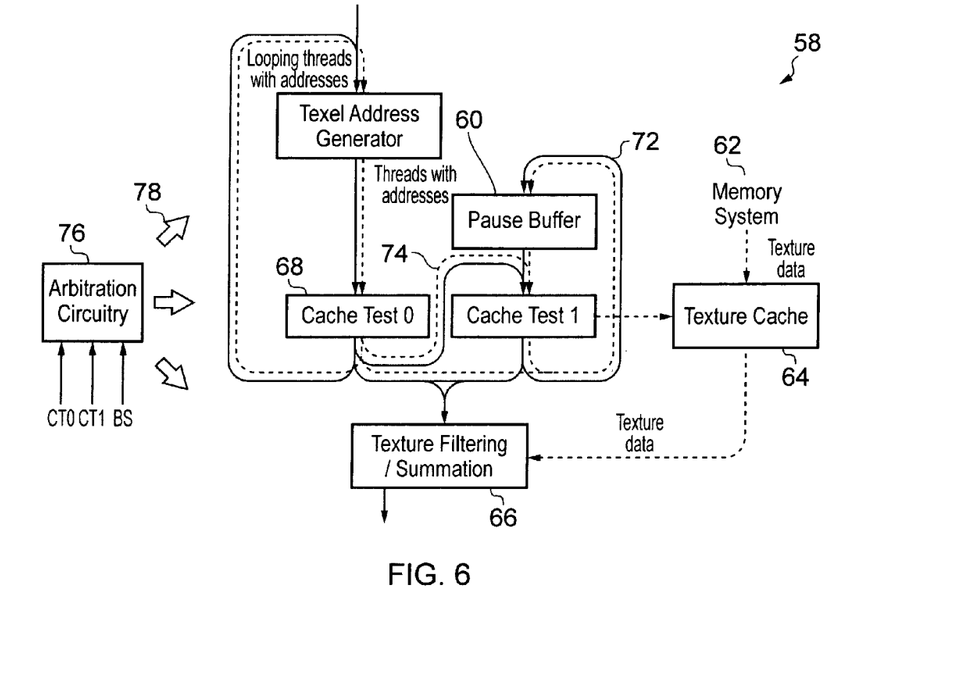
FIG. 6 illustrates another example embodiment of a portion of a processing pipeline utilising the present techniques.
Figure 7:
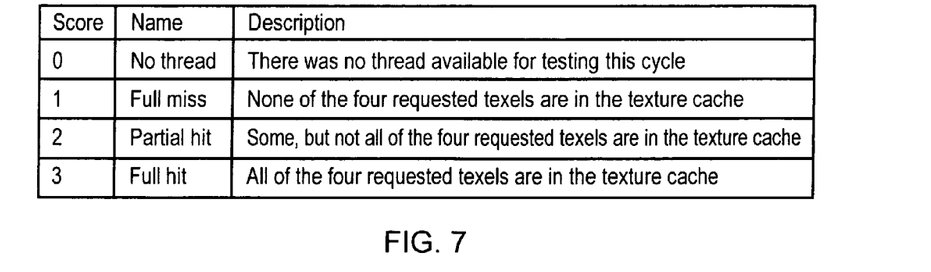
FIG. 7 is a table illustrating query responses indicating data not required, full miss, a partial hit and a full hit.

FIG. 6 schematically illustrates another embodiment of a portion of a processing pipeline 58 illustrated. This portion of the processing pipeline 58 includes a pause buffer 60 (buffer) a memory system 62 (main memory) and a texture cache 64 (cache memory). A texture filtering and summation stage 66 serves to fetch data from the texture cache 64 in respect of a program instruction supplied to the texture filtering and summation stage 66. A cache test generator 68 serves to generate a main query request and a cache test generator 70 serves to generate a buffer query request. Both of these query requests are sent to the texture cache 64 which returns a main query response and a buffer query response. These query responses can include values indicating a full miss, a partial hit and a full hit as illustrated in FIG. 7. If a particular program instruction passed to the cache test circuitry 60, 70 does not require a data fetch, then this corresponds to no thread being tested for this particular processing cycle by that cache test circuitry 68, 70.

The pause buffer 60 is a first-in-first-out memory and its output is connected to the cache test circuitry 70 which receives and stores the least recently added program instruction from the pause buffer 60. This program instruction from the cache test circuitry 70 may be recirculated back into the pause buffer 60 via the path 72 illustrated. If a miss occurs for both the cache test circuitry 60 and the cache test circuitry 70, then the program instruction from the cache test circuitry 70 is recirculated back to the pause buffer 60 via the path 72 and the program instruction from the cache test circuitry 68 is moved to the cache test circuitry 70 via the path 74. This avoids the need for a dual port write mechanism into the pause buffer 60.

FIG. 7 is a table illustrating score values generated in response to the query requests produced by the cache test circuitry 60 and the cache test circuitry 70. The score values may each have values 0, 1, 2, 3. This gives 16 possible combinations of outcomes of the two cache tests.

FIG. 8 is a table illustrating how arbitration circuitry 76 associated with the portion of the pipeline 58 generates control signals 78 for controlling the portion of the pipeline 58 in response to the cache test outcomes CT0 and CT1 together with the buffer status of the pause buffer 60. In this table a "texel" denotes a texture pixel value and corresponds to data from within the texture cache 64 which is to be fetched by the texture filtering and summation stage 66. The threads referred to FIG. 8 correspond in graphics processing unit terminology to program instructions. These threads are independent of each other so as to permit fine-grain multi-threaded processing to be performed.

The above example embodiment has been described mainly in the context of the access requests requiring service being read access requests. The present techniques are also applicable to write access requests. Such write access requests may be determined to be ready to be serviced by the cache memory when the data corresponding to the memory address(es) being written is present within the cache. In other embodiments a write access may be determined ready to be serviced when there is an available storage location within the cache to which the data can be written even if the cache does not already contain the existing data values for the memory address(es) concerned.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
A cache memory coupled to a main memory;
a processing pipeline, coupled to said cache memory, configured to process a stream of program instructions and having a plurality of processing stages including a main query stage, responsive to a program instruction at said main query stage, configured to generate a main query request to said cache memory, said cache memory, responsive to said main query request, configured to generate a main query response signal indicative of whether or not said cache memory is ready to service an access request by said program instruction at said main query stage;
a buffer configured to store said program instruction from said main query stage if said main query response signal indicates said cache memory is not ready to service said access request by said program instruction at said main query stage;
a buffer query stage, separate from said main query stage and responsive to a program instruction stored within said buffer, configured to generate a buffer query request to said cache memory, said cache memory, responsive to said buffer query request, configured to generate a buffer query response signal indicative of whether or not said cache memory is ready to service an access request by said program instruction stored within said buffer; and
a fetch stage, responsive to said main query response signal and said buffer query response signal, configured to access said cache memory to service one of said access request by said program instruction at said main query stage and said access request by said program instruction stored within said buffer, wherein a clock signal defines boundaries between processing cycles of said apparatus and a fetch, said main query request and said buffer query request take place in a same processing cycle.

2. Apparatus as claimed in claim 1, wherein said access request by said program instruction at said main query stage is one of a read access request and a write access request.

3. Apparatus as claimed in claim 1, wherein said access request by said program instruction at said buffer query stage is one of a read access request and a write access request.

4. Apparatus as claimed in claim 1, wherein said buffer is a first-in-first-out memory and said program instruction stored within said buffer and corresponding to said buffer query request is a program instruction least recently added to said first-in-first-out memory.

5. Apparatus as claimed in claim 1, wherein said cache memory is configured concurrently to receive and then to respond to said main query request and said buffer query request.

6. Apparatus as claimed in claim 1, wherein if said program instruction at said main query stage does not require any data, then said main query request indicates that data is not required.

7. Apparatus as claimed in claim 1, wherein if said buffer is empty, then said buffer query request indicates that data is not required.

8. Apparatus as claimed in claim 1, comprising arbitration circuitry responsive to said main query response and to said buffer query response to control said main query stage, said buffer and said fetch stage.

9. Apparatus as claimed in claim 8, wherein said arbitration circuitry is responsive to receiving said main query request indicating data is not required and said buffer query request indicating data is not required to hold idle said main query stage, said buffer and said fetch stage.

10. Apparatus as claimed in claim 8, wherein said arbitration circuitry is responsive to said main query request indicating data is not required and said buffer query response indicating data required by said program instruction stored within said buffer is not present within said cache memory to remove said program instruction stored within said buffer from said buffer and to return said program instruction stored within said buffer to said main query stage.

11. Apparatus as claimed in claim 8, wherein said arbitration circuitry is responsive to said main query request indicating data is not required and said buffer query response indicating data required by said program instruction stored within said buffer is present within said cache memory to remove said program instruction stored within said buffer from said buffer and to trigger said fetch stage to fetch said data required by said program instruction stored within said buffer.

12. Apparatus as claimed in claim 8, wherein said arbitration circuitry is responsive to said main query request indicating said data required by said program instruction at said main query stage is not present within said cache memory, said buffer query response indicating that data is not required and said buffer currently storing no program instructions to add said program instruction at said main query stage to said buffer and to trigger a new program instruction to enter said main query stage.

13. Apparatus as claimed in claim 8, wherein said arbitration circuitry is responsive to said main query request indicating said data required by said program instruction at said main query stage is not present within said cache memory, said buffer query response indicating that data required by said program instruction stored within said buffer is not present within said cache memory and said buffer is currently not full to add said program instruction at said main query stage to said buffer and to trigger a new program instruction to enter said main query stage.

14. Apparatus as claimed in claim 8, wherein said arbitration circuitry is responsive to said main query request indicating said data required by said program instruction at said main query stage is not present within said cache memory, said buffer query response indicating that data required by said program instruction stored within said buffer is not present within said cache memory and said buffer memory is currently full to remove said program instruction stored within said buffer from said buffer, to return said program stored within said buffer to said main query stage and to add said program instruction at said main query stage to said buffer.

15. Apparatus as claimed in claim 8, wherein said arbitration circuitry is responsive to said main query request indicating said data required by said program instruction at said main query stage is not present within said cache memory and said buffer query response indicating that data required by said program instruction stored within said buffer is present within said cache memory to remove said program instruction stored within said buffer from said buffer, to trigger said fetch stage to fetch said data required by said program instruction stored within said buffer and to add said program instruction at said main query stage to said buffer.

16. Apparatus as claimed in claim 8, wherein said arbitration circuitry is responsive to said main query request indicating said data required by said program instruction at said main query stage is present within said cache memory, said buffer query response indicating that data is not required and said buffer currently storing no program instructions to remove said program instruction at said main query stage, to trigger said fetch stage to fetch said data required by said program instruction stored at said main query stage and to trigger a new program instruction to enter said main query stage.

17. Apparatus as claimed in claim 8, wherein said arbitration circuitry is responsive to said main query request indicating said data required by said program instruction at said main query stage is present within said cache memory and said buffer query response indicating that said data required by said program instruction stored within said buffer is not present within said memory to remove said program instruction at said main query stage, to trigger said fetch stage to fetch said data required by said program instruction stored at said main query stage, to trigger a new program instruction to enter said main query stage and to hold said buffer idle.

18. Apparatus as claimed in claim 8, wherein said arbitration circuitry is responsive to said main query request indicating said data required by said program instruction at said main query stage is present within said cache memory and said buffer query response indicating that said data required by said program instruction stored within said buffer is present within said memory to remove said program instruction at said main query stage, to trigger said fetch stage to fetch said data required by said program instruction stored at said main query stage, to trigger a new program instruction to enter said main query stage and to hold said buffer idle.

19. Apparatus as claimed in claim 8, wherein said arbitration circuitry is responsive to said main query request indicating said data required by said program instruction at said main query stage is present within said cache memory and said buffer query response indicating that said data required by said program instruction stored within said buffer is present within said memory to remove said program instruction stored within said buffer from said buffer, to trigger said fetch stage to fetch said data required by said program instruction stored within said buffer, to add said program instruction at said main query stage to said buffer and to trigger a new program instruction to enter said main query stage.

20. Apparatus as claimed in claim 8, wherein said arbitration circuitry is responsive to said main query request indicating said data required by said program instruction at said main query stage is present within said cache memory and said buffer query response indicating that said data required by said program instruction stored within said buffer is present within said memory to remove said program instruction stored within said buffer from said buffer, to trigger said fetch stage to fetch said data required by said program instruction stored within said buffer, to add said program instruction at said main query stage to said buffer at an output location of said buffer and to trigger a new program instruction to enter said main query stage.

21. Apparatus as claimed in claim 8, wherein said main query response indicates one of said data required by said program instruction at said main query stage is one of fully present within said cache memory, partially present within said cache memory and not present within said cache memory and said buffer query response indicates one of said data required by said program instruction stored within said buffer is one of fully present within said cache memory, partially present within said cache memory and not present within said cache memory and said arbitration circuitry controls said main query stage, said buffer and said fetch stage to prioritize fetching of data indicated as fully present within said cache memory before fetching of data indicated as partially present within said cache memory.

22. Apparatus as claimed in claim 1, wherein said main query response indicates one of said data required by said program instruction at said main query stage is one of fully present within said cache memory, partially present within said cache memory and not present within said cache memory and said buffer query response indicates one of said data required by said program instruction stored within said buffer is one of fully present within said cache memory, partially present within said cache memory and not present within said cache memory.

23. Apparatus as claimed in claim 1, wherein said stream of program instructions specify fine-grained multi-threaded processing.

24. Apparatus as claimed in claim 1, wherein said apparatus is part of a graphics processing unit.

25. Apparatus for processing data comprising:
cache memory means for storing data and coupled main memory means for storing data;
processing pipeline means for processing a stream of program instructions and coupled to said cache memory means, said processing pipeline means having a plurality of processing stage means for processing including main query stage means for generating a main query request to said cache memory means in response to a program instruction at said main query stage means, said cache memory means, responsive to said main query request, for generating a main query response signal indicative of whether or not said cache memory is ready to service an access request by said program instruction at said main query stage means;
buffer means for storing said program instruction from said main query stage means if said main query response signal indicates said cache memory is not ready to service said access request by said program instruction at said main query stage means;
a buffer query stage means for generating a buffer query request to said cache memory means in response to a program instruction stored within said buffer means, said cache memory means, said buffer query stage is separate from said main query stage and is responsive to said buffer query request, for generating a buffer query response signal indicative of whether or not said cache memory is ready to service an access request by said program instruction stored within said buffer means; and
fetch stage means for accessing said cache memory means to service one of said data access request by said program instruction at said main query stage means and said access request by said program instruction stored within said buffer means in response to said main query response signal and said buffer query response signal, wherein a clock signal defines boundaries between processing cycles of said apparatus and a fetch, said main query request and said buffer query request take place in a same processing cycle.

26. A method of processing data comprising the steps of:
storing data within a cache memory, said cache memory coupled to a main memory;
processing a stream of program instructions within a processing pipeline coupled to said cache memory, said processing pipeline having a plurality of processing stages including main query stage;
generating a main query request to said cache memory in response to a program instruction at said main query stage;
in response to said main query request, generating a main query response signal indicative of whether or not said cache memory is ready to service an access request by said program instruction at said main query stage;
storing within a buffer said program instruction from said main query stage if said main query response signal indicates said cache memory is not ready to service said access request by said program instruction at said main query stage;
generating a buffer query request, separate from said main query stage, to said cache memory in response to a program instruction stored within said buffer;
in response to said buffer query request, generating a buffer query response signal indicative of whether or not said cache memory is ready to service an access request by said program instruction stored within said buffer; and
accessing said cache memory to service one of: said access request by said program instruction at said main query stage; and said access request by said program instruction stored within said buffer in response to said main query response signal and said buffer query response signal, the above method steps are implemented on a data processing system, wherein a clock signal defines boundaries between processing cycles of said method and a fetch, said main query request and said buffer query request take place in a same processing cycle.

\* \* \* \* \*

UNITED STATES PATENT AND TRADEMARK OFFICE
CERTIFICATE OF CORRECTION

| | | |
|---|---|---|
| PATENT NO. | : 8,977,815 B2 | Page 1 of 1 |
| APPLICATION NO. | : 12/926600 | |
| DATED | : March 10, 2015 | |
| INVENTOR(S) | : Heggelund et al. | |

It is certified that error appears in the above-identified patent and that said Letters Patent is hereby corrected as shown below:

On the title page item [75] "Edvard Feilding" should read -- Edvard Fielding --.

Signed and Sealed this
Third Day of November, 2015

Michelle K. Lee
*Director of the United States Patent and Trademark Office*